(12) United States Patent
Lewis et al.

(10) Patent No.: US 7,126,627 B1
(45) Date of Patent: Oct. 24, 2006

(54) VIDEO CONFERENCING DEVICE AND METHOD

(76) Inventors: Thomas B. Lewis, 350 Parnassus Ave., #909, San Francisco, CA (US) 94117; George Meixel, 8507 Terrace Dr., El Cerrito, CA (US) 94530

( * ) Notice: Subject to any disclaimer, the term of this patent is extended or adjusted under 35 U.S.C. 154(b) by 591 days.

(21) Appl. No.: 10/092,667

(22) Filed: Mar. 6, 2002

(51) Int. Cl.
    *H04N 7/14* (2006.01)

(52) U.S. Cl. .............................. 348/14.16; 348/14.08; 348/14.1

(58) Field of Classification Search .. 348/14.01–14.09, 348/14.1, 14.11–14.14, 14.16
See application file for complete search history.

(56) References Cited

U.S. PATENT DOCUMENTS

| | | | |
|---|---|---|---|
| 5,117,285 A | 5/1992 | Nelson et al. | 358/85 |
| 5,317,405 A | 5/1994 | Kriki et al. | 348/20 |
| 5,400,069 A | 3/1995 | Braun et al. | 348/20 |
| 5,500,671 A | 3/1996 | Andersson et al. | 348/15 |
| 5,572,248 A | 11/1996 | Allen et al. | 348/15 |
| 5,612,733 A | 3/1997 | Fllohr | 348/14 |
| 5,619,254 A | 4/1997 | McNelley | 348/20 |
| 5,666,155 A | 9/1997 | Mersereau | 348/20 |
| 5,751,337 A | 5/1998 | Allen et al. | 348/15 |
| 5,777,665 A | 7/1998 | McNelley et al. | 348/20 |
| 5,856,842 A | 1/1999 | Tedesco | 348/20 |
| 5,953,052 A | 9/1999 | McNelley et al. | 348/20 |
| 6,042,235 A | 3/2000 | Machtig et al. | 353/28 |
| 6,160,573 A | 12/2000 | Allen et al. | 348/15 |
| 6,208,373 B1 | 3/2001 | Fong et al. | 348/14.16 |
| 6,243,130 B1 | 6/2001 | McNelley et al. | 348/20 |
| 6,326,994 B1 * | 12/2001 | Yoshimatsu | 348/46 |
| 6,677,980 B1 * | 1/2004 | Jeon | 348/14.16 |
| 6,806,847 B1 * | 10/2004 | Nixon et al. | 345/2.1 |
| 2003/0112325 A1 * | 6/2003 | Boyden et al. | 348/14.16 |

* cited by examiner

*Primary Examiner*—Melur Ramakrishnaiah
(74) *Attorney, Agent, or Firm*—Dergosits & Noah LLP

(57) ABSTRACT

A method and device for video conferencing between first and second conference locations. Each conference location is provided with a video camera and a video image monitor to carry the image of a video conferee to a remote location. The video cameras are located proximate the video monitors such that each video camera is placed upon an emotionally neutral field of the image of the remotely located conferee and aimed substantially at the eyes of the local conferee facing the conferee's monitor in order to create eye-to-eye contact between conferees while positioning the video camera as to not interfere with said conference.

14 Claims, 12 Drawing Sheets

VIDEO CONFERENCING DEVICE AND METHOD

TECHNICAL FIELD

The present invention is involved with a method and device for video conferencing between remote conference locations. The device consists of a video camera and image receiver, the image receiver being provided with a border and within the border, an image field for displaying the video image from the remote location. The video camera is mounted within the image field such as to promote eye-to-eye contact between conferees without camera intrusion.

BACKGROUND OF THE INVENTION

Although video teleconferencing offers an attractive alternative to face-to-face meetings, its adoption has not been as pervasive as predicted. Certainly with the cost and inconvenience of air travel, being able to conduct conferences through electronic video conferencing provides a low cost and convenient alternative. However, the ergonomics inherent in video conferencing to date have limited its application.

It is well known that in addition to what is said at a meeting, emotional signals which are non-verbally communicated between parties can be very important. In the human body, muscle is the tissue that is specialized for the production of movement. Every muscle in the body connects to other structures via tendons, except in the human face. There, muscles connect directly to the skin. The musculature of the human face has evolved for a particular purpose, that is, to produce a variety of movements in the surface of the face, movements that are elements of a signaling system between human beings. The visible movements in the skin produced by facial muscles are called facial expressions. All human beings share an identical facial anatomy; they all have the same facial movements arranged in the same manner. Further, as demonstrated by various research practitioners, all human beings generate the same invariant group of facial expressions. In addition, all human beings are born with systems necessary to interpret those facial expressions.

Facial expressions therefore constitute an innate communication system, the evolutionary roots of which far predate spoken or written language. All written language is at most ten thousand years old, and spoken language a few hundred thousand years old. By contrast, the signaling system of which facial expressions are a part is approximately one hundred million years old. It is noted that specific areas of the human brain are dedicated to the processing of human facial expressions. Neural systems in the brain that decode facial expressions are significantly older than those responsible for conscious and voluntary behaviors. The decoding of facial expressions is part of an inherited neural architecture in the brain—it is invariant and involuntary.

The eyes are of particular importance in emotional signaling. Not only do the eyes contribute to the display of emotions such as fear or surprise, but human beings also use eye contact and the direction of gaze to communicate signals about the emotional context of an interaction. Eye contact and gaze direction impart information about the participants' perceptions of their relative social rank, personal power, trustworthiness, mutual liking, and assertiveness. Eye contact signals are also crucial in coordinating the exchange of speaking and listening roles, which occurs rapidly and fluently within normal conversational speech. Not surprisingly, research has demonstrated that human beings are highly proficient at making precise determinations about gaze direction in others. This function, as well as the decoding of complex signals inherent in eye contact, occurs on an involuntary basis.

Unfortunately, video teleconferencing involves an inherent lack of eye contact as part of the overall conferencing experience. Eye contact is not promoted by current terminal configurations because, generally, the video camera necessary to feed the video portion of the conference is placed either at the top or sides of the video monitor so as not to obstruct the image of the remotely located conferee. Typically, the camera is placed somewhere above the display monitor such as depicted in U.S. Pat. No. 5,900,907. If the conferee looks directly at the monitor in conversing with the remotely located conferee, the conferee is captured at an angle above the conferee's viewing level or head. Thus, when an image of that participant is displayed at the remote station, it appears as if the participant is looking down toward the ground. This can perhaps be best appreciated in viewing FIG. 1 whereby conferee 10 is shown looking directly into viewing area 21 as part of monitor 20. However, camera 22, perched above monitor 20 captures the face of conferee 10 at a parallax angle making it seem as if conferee 10 is looking down by that same angle to the counterpart of conferee 10 at the remote location. Without suitable eye contact, the potential of video conferencing is greatly reduced.

There has been a plethora of suggestions to correct the above-noted deficiency. For example, previously mentioned U.S. Pat. No. 5,900,907 suggests placing a camera atop the video monitor with a bracket and housing that enables the camera to extend below the top edge of the monitor and onto the upper region of the image field. However, such a configuration does not enable the camera lens to extend far enough within the image to reduce the parallax angle a sufficient amount to cure the problem. In addition, the camera housing clearly obstructs the image field and detracts from the video conferencing experience.

Others, such as is shown in U.S. Pat. No. 5,777,665, have used beam splitters, prisms and optical refraction devices enabling the camera to be placed outside the field of vision. However, these approaches require bulky equipment and are distracting in presenting a certain amount of visual obstruction. For example, U.S. Pat. No. 5,400,069 suggests the use of a half-silvered mirror as a projection screen with a camera placed behind the apparent location of the face of the remotely located conferee. Such devices are necessarily large and cumbersome. Moreover, because the conferee cannot see the camera filming the event, the conferee never actually looks at the camera, but merely in the general direction of the eyes of the remote conferee.

Another approach was suggested by U.S. Pat. No. 5,500,671. In this instance, it was suggested that computer software be employed to manipulate video images on the fly so that instead of an actual face, the viewer looks at a "virtual" face in which various facial features have been altered and reconstructed to simulate eye contact. This approach is obviously hardware and software intensive and is thus expensive to construct and employ and thus somewhat impractical.

As a fall back position in light of the seeming shortcomings of the prior art, the most common practice in the video conferencing industry today is to simply place the conferee at a remote distance from the camera and associated monitor in order to reduce the parallax angle. Although by doing so, the parallax angle is, in fact, reduced, this "solution" sacrifices the participants' ability to discern the details of each other's faces and encourages them to raise their voices to tiring levels in an unconscious reaction to the distance. Ideally, each conferee should be between 2 and 8 feet from the video monitor such that the size of the face of the remote conferee is "life-size."

It is thus an object of the present invention to provide a method and apparatus for conducting video conferencing which avoids the problems associated with such prior art devices.

It is yet a further object of the present invention to provide a method and associated apparatus for conducting video conferencing which promotes eye contact between conferees without the need for engaging in complicated and expensive peripheral equipment in order to achieve this goal.

These and further objects will be more readily apparent when considering the following disclosure and appended claims.

SUMMARY OF THE INVENTION

The present invention is directed towards a method of video conferencing and apparatus useful in carrying out the recited method. Each remote conference location is provided with a video conferee, a video camera and an image monitor, wherein each monitor displays an image of the remote conferee. The video camera in each location is placed proximate its associated video monitor and is positioned at an emotionally neutral field of the image of the remote conferee as appearing upon the video monitor. Ideally, the optical axis of each video camera is aimed at the eyes of the conferee facing the video monitor at an angle that promotes the sense of direct eye contact between conferees.

DETAILED DESCRIPTION OF THE INVENTION

Figure 1:
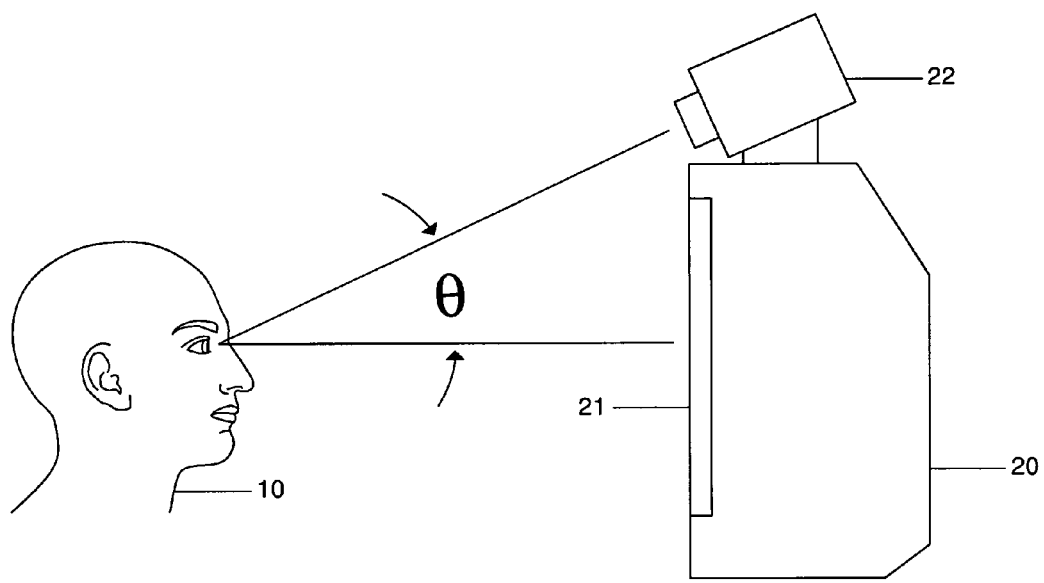
FIG. 1 is a side plan view of a conferee and video monitor of the prior art.
Figure 2:
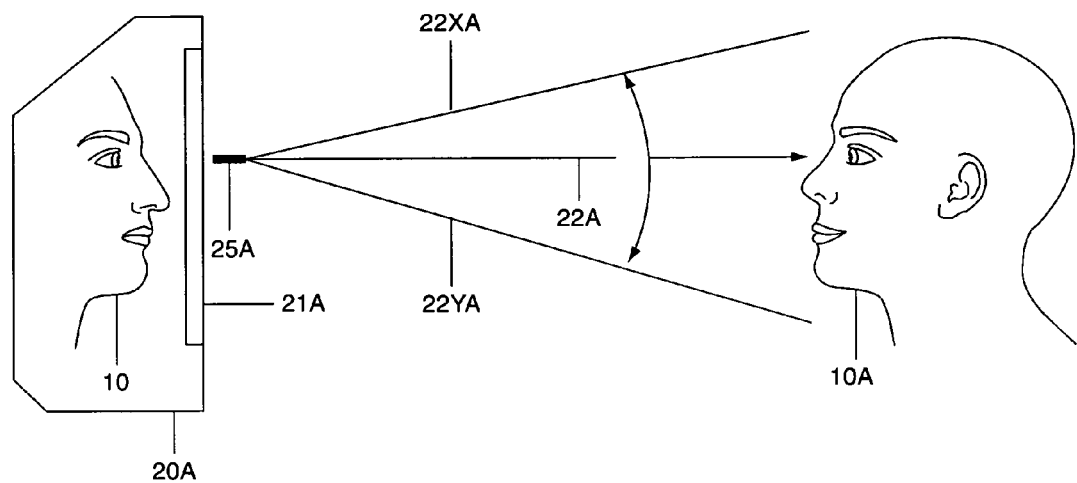
FIG. 2 is a side plan view of a conferee, video camera and monitor showing, schematically, viewing orientations of these component parts.

In maximizing eye contact, reference is made to FIG. 2. Conferee 10 is ideally seated from 2 to 8 feet from video monitor 20 and particularly, its front face carrying image field 21 displaying the image of remotely located conferee 10a. To maximize direct eye contact, FIG. 2, shows camera 25 on or proximate to image field 21 at the eye level of conferees 10 and 10A. Stated differently, video camera 25 is placed in front of monitor 20 within image field 21 whereby its optical axis coincides with the sight line 22 drawn between the eyes of the respective conferees. The camera's field of view is shown by phantom lines 22A and 22B and is adjusted and the conferees positioned so that the size of the facial image as it appears on the monitor at the remote location is approximately the same size as it would be if the conferee was attending a conference physically. However, as the prior art well recognized, placing camera 25 in front of the eyes of an image of the remote conferee with its optical axis coinciding with the sight line between conferees interferes with eye contact communication because the camera obscures regions of high emotional signal at and around the eyes.

Figure 3:
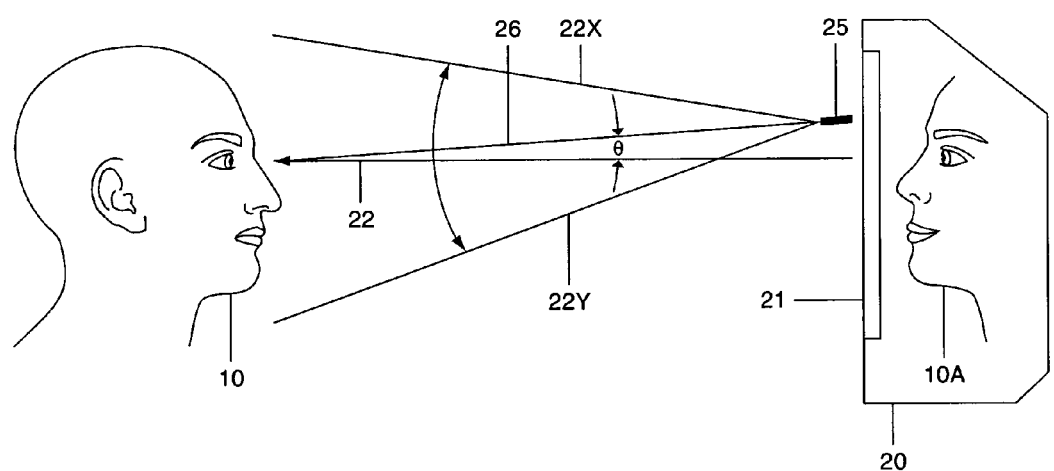
FIG. 3 is yet another side plan views of a conferee, video monitor and appended video camera positioned according to the present invention.

The present invention can be appreciated by reference to FIG. 3. For sake of direct comparison, common reference numerals are employed wherever possible while the depictions of local and remote conferees 10 and 10A, the latter being displayed through video monitor 20 within image field 21 remains consistent as well. However, in the present instance, camera 25, instead of being located within image field 21 in front of the eyes of the video image of remote conferee 10A is moved a distance above the eyes of conferee 10A. Unlike suggestions made by the prior art, the present invention contemplates locating video camera 25 directly within image field 21 facing conferee 10 and within an emotionally neutral field of conferee 10A.

Camera 25 is moved to an emotionally neutral field defined with respect to a portion of the face of remotely located conferee 10A, as it appears over monitor 20. Clearly, repositioning camera 25 away from the eyes of the image of conferee 10A to an emotionally neutral field of conferee 10A restores the possibility for eye direct contact. The definition of an "emotionally neutral field" of the facial portion of a conferee will be discussed hereinafter. In the present discussion of FIG. 3, it is important to only note that camera 25 has been moved away from and above the eyes of the image of remotely located conferee 10A in order to enable the conferees to engage in direct eye contact while substantially avoiding the creation of a significant parallax angle which would otherwise result in a conferee being sensed as looking downward from a remote location.

It is quite apparent then that camera 25 should be positioned above the eyes of conferee 10A a distance which does not provide for a significant parallax angle and yet is not positioned directly in front of the eyes of conferee 10A to enable each conferee to establish direct eye contact. As such, it is of critical importance in practicing the present invention to limit the height to which camera 25 can be moved above eye-to-eye line of sight 22. It has now been determined that the lines of sight and the camera's optical axis will be perceived as being coincident resulting in perceived eye contact if the camera angle θ as shown in FIG. 3 is less than the critical camera angle for direct eye contact, $\theta_{crit}$. It has now been determined that $\theta_{crit}$ should be no greater than 3 degrees, although the actual value for $\theta_{crit}$ may be influenced by several variables including video resolution, video frame rate and lighting. In this regard, the camera angle θ, can be expressed as:

$$\theta = (\tan^{-1}(H/D))$$

where

θ=the angle between the camera's optical axis and the line of sight between the eyes of conferees.

H=camera height above the sight line between the eyes of conferees.

D=horizontal distance between the camera and the eyes of the conferee facing it.

Certainly, if θ is less than $\theta_{crit}$ then direct eye contact is perceived between video conferees.

Figure 4:
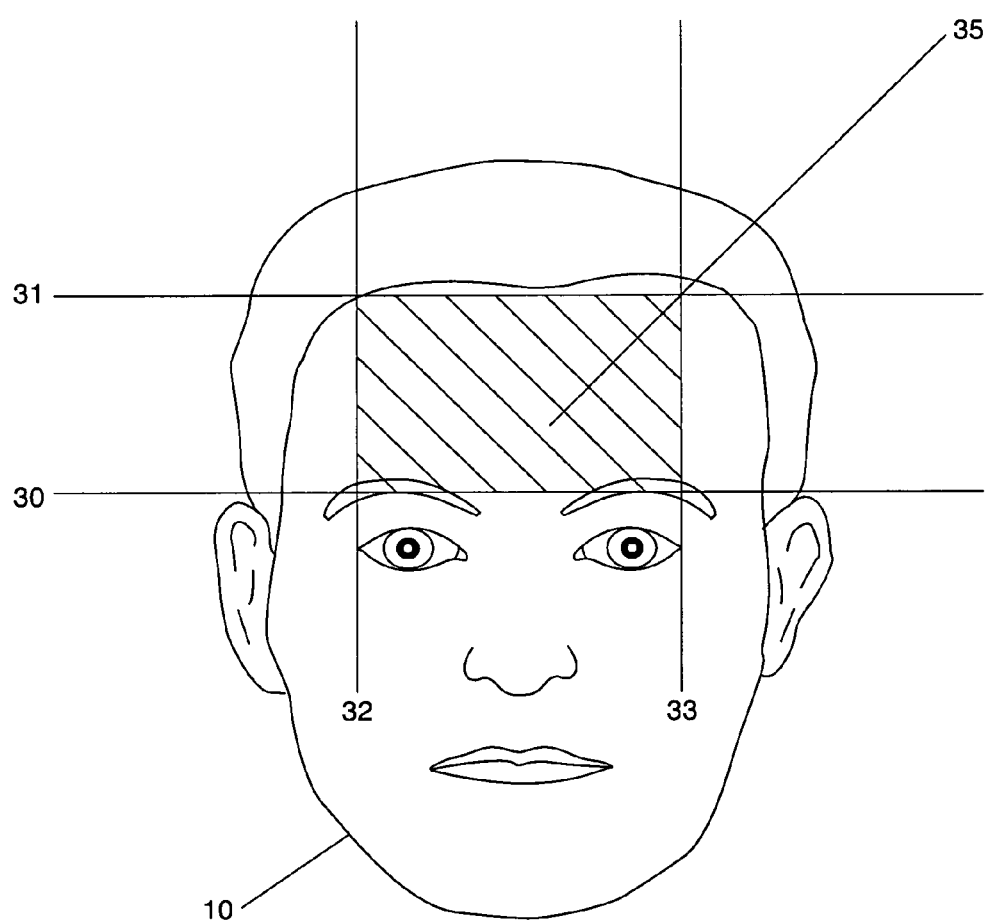
FIG. 4 is a front plan view of the face of a typical conferee employing the present invention showing the video camera at the conferee's emotionally neutral field.

FIG. 4 depicts the recited emotionally neutral field referred to previously. This field is defined by horizontal boundary lines 30 and 31, the former being slightly above eye level and the latter at conferee 10's hairline (or upper extremity of the forehead) while vertical lines 32 and 33 are defined by the outer extremities of the eyes of conferee 10. It is a cornerstone of the present invention that it has now been realized that a small object, such as camera 25 located on or proximate image field 21 of video monitor 20 at emotionally neutral area 35 of the face of the image of remote conferee 10A does not, in fact, produce an unacceptable obstruction. In much the same way that people do not mind speaking to a person wearing glasses, it does not bother them to speak to a person who appears to have a small black circle (the camera lens) in the center of the conferee's forehead, again, in emotionally neutral (shaded) area 35. It has been determined that the mind quickly habituates to the irrelevant sensory detail presented by camera 25 and subsequently simply ignores it.

In order to enhance the irrelevance of the obstruction created by the lens of camera 25, it is preferable to provide camera 25 in the form of a cylindrical video camera having a small diameter. It was found that a "lipstick case" shaped camera having a diameter of 0.5 inches and a length of 2.5 inches clearly performed adequately in carrying out the present invention. Current technology has provided even smaller video cameras such as those used in invasive medical procedures such as in laparoscopy and colonoscopy which would provide even less intrusion. As such, although the prior art has taught to avoid placing the camera within image field 21 as, to do so, would interfere with the video conferencing experience, it has now been determined through the present invention that, when the camera is of a small dimension and placed in an emotionally neutral field of the image of the remote conferee, there is no unacceptable intrusion. Yet, the present invention promotes direct eye contact between conferees. As noted, such eye contact and facial expression is needed to promote a successful video conference as an excellent substitute to a face-to-face physical conference.

Figure 5:
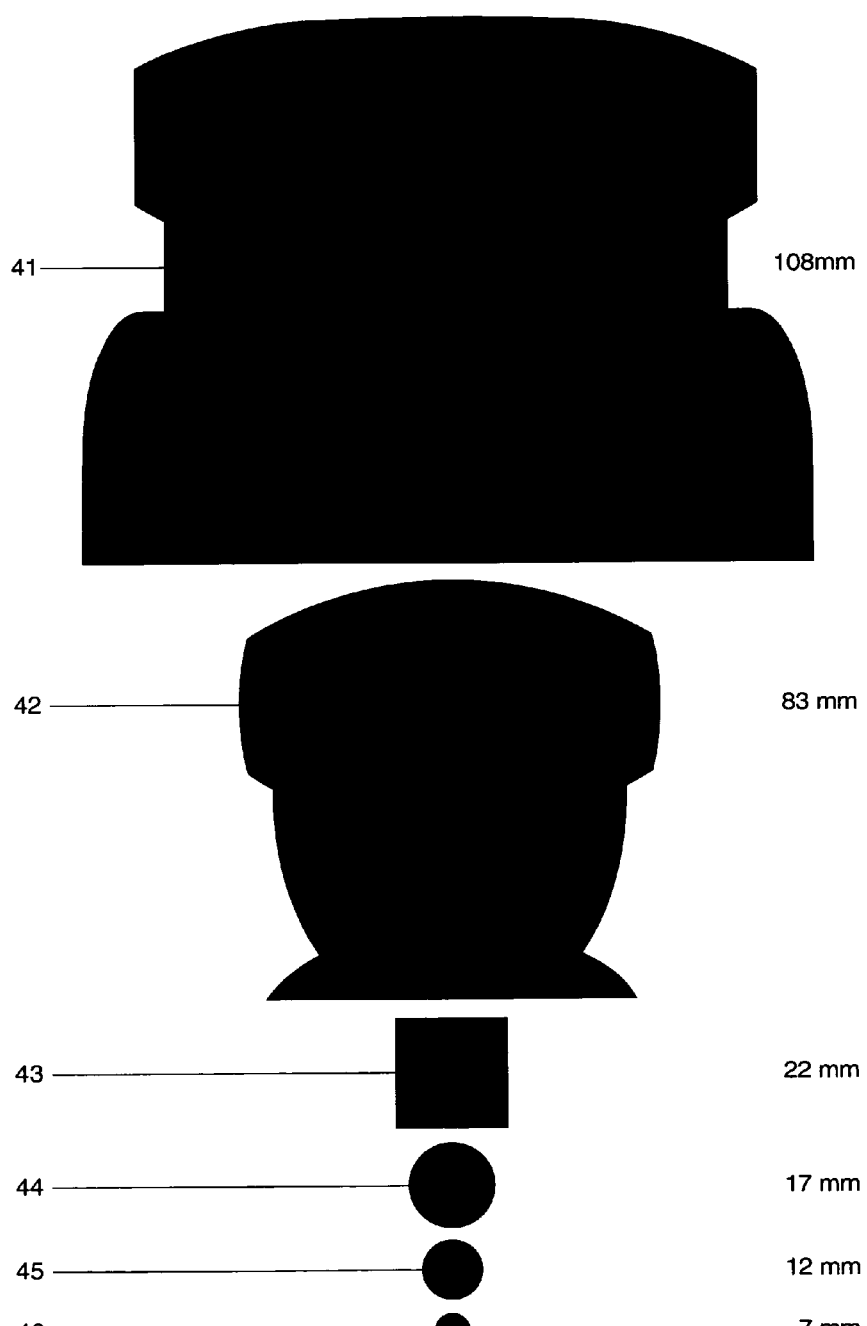
FIG. 5 displays a series of front plan views of various examples of camera sizes for comparison, some of which are useful in practicing the present invention.

In light of the above noted discussion, not only is the camera position important, but camera intrusion upon the video conferencing experience is also influenced by the camera's size. FIG. 5 depicts camera "footprints" perpendicular to the optical axis, some of which are suitable for practicing the present invention while others are not. For example, rectangular image 41 depicts the body of Sony's EV1-D30 camera which is widely used in traditional video conferencing systems. It features (1) pan-tilt-zoom to adjust the field of view, (2) focus control, and (3) an automatic iris. The cross section of this camera, however, is too large for practicing the present invention for it substantially prevents eye contact when the camera is placed as suggested herein. Body "footprint" 41 of Sony's EV1-D30 has cross sectional dimensions perpendicular to the axis of viewing of 141 mm×108 mm (5.6 in.×4.2 in.). Such a camera is typically positioned on top of the monitor. If such a camera was to be centered as suggested, it would obstruct eye-to-eye contact.

FIG. 5 further shows other camera "footprints" of decreasing size as viewed perpendicularly to each camera's optical axis. Rectangle 42 depicts the Polycom ViaVideo video conferencing camera. Again, this lens size mandates placement of the camera on top of the monitor. To reiterate, the typical video conferencing cameras like those shown as elements 41 and 42, requiring placement on top of the monitor results in a parallax angle between the camera's optical axis and the line established by direct eye to eye contact between conferees of from 8 to 15 degrees which is clearly larger than the critical angle necessary for practicing the present invention. Even lens 43 of Hitachi's KP-D8 video camera is marginally too large. However "footprints" 44, 45 and 46 representing Panasonic's GP-KS1000, Sony's DXC-LS1 and Toshiba's 1K-SM43H, respectively, can be employed in successfully practicing the present invention.

As noted previously, the present invention contemplates using miniature cameras that have a lens "footprints" sufficiently small to enable conferees to establish eye-to-eye contact while not detracting from the conference experience. Ideally, the present invention contemplates employing miniature cameras in which the lens "footprint" perpendicular to the camera's optical axis is no greater than 12 mm (0.47 in.) when used with a monitor having image field 21 with a diagonal dimension of 27 inches or greater.

Figure 9:
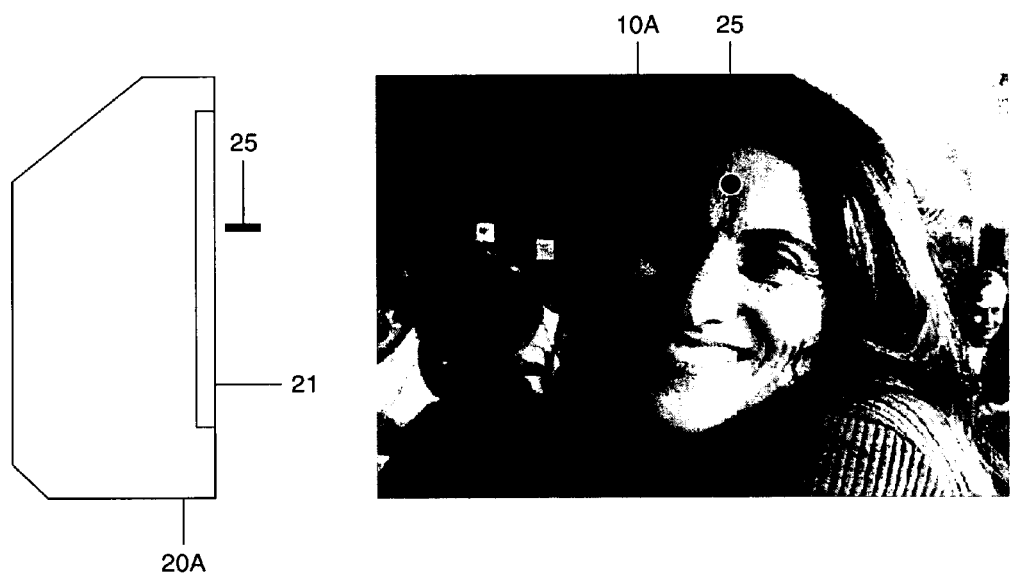
FIG. 9 depicts an image of a remote conferee on a monitor with an associated video camera as the image would appear in practicing the present invention.

FIG. 9 depicts a side view and front view of a monitor showing the positioning of camera 25 within image field 21 and the effect that such positioning would have in establishing direct eye contact with remotely located conferee 10A. It is noted that camera 25 is positioned within emotionally neutral field of conferee 10A; in this instance, approximately at the middle of the forehead of the remotely located conferee. It is noted that camera 25 does not present an impediment in establishing facial contact with conferee 10A while the positioning of camera 25 as shown enables the conferees to perceive direct eye contact during video conferencing.

In practicing the present invention, the positioning of the video camera often requires that it be tilted downward slightly and aimed at the subject's eyes as best depicted in FIG. 3. However, if the video conferee moves to one side, the camera must also be panned to center the image. Camera support devices have been developed with the capabilities needed to carry out this repositioning and aiming. While the base of the camera's support assembly is designed to rest on the top of monitor 20, such devices are intended to position the camera in front of the image of the remote video conferee within his or her emotionally neutral field 35.

There are many ways to support camera 25 on or in conjunction with image field 21. For example, a suction cup or a similar adhering device (not shown) could be removeably retained upon image field 21, the rubber body of which could capture a portion of camera 25. However, the use of such a simplistic device would make it difficult to reposition camera 25 in the event that the conferee moved away from the camera's optical axis. The better solution would be to adopt commercially available devices for retaining suitable video cameras as described hereinafter.

Figure 6A:
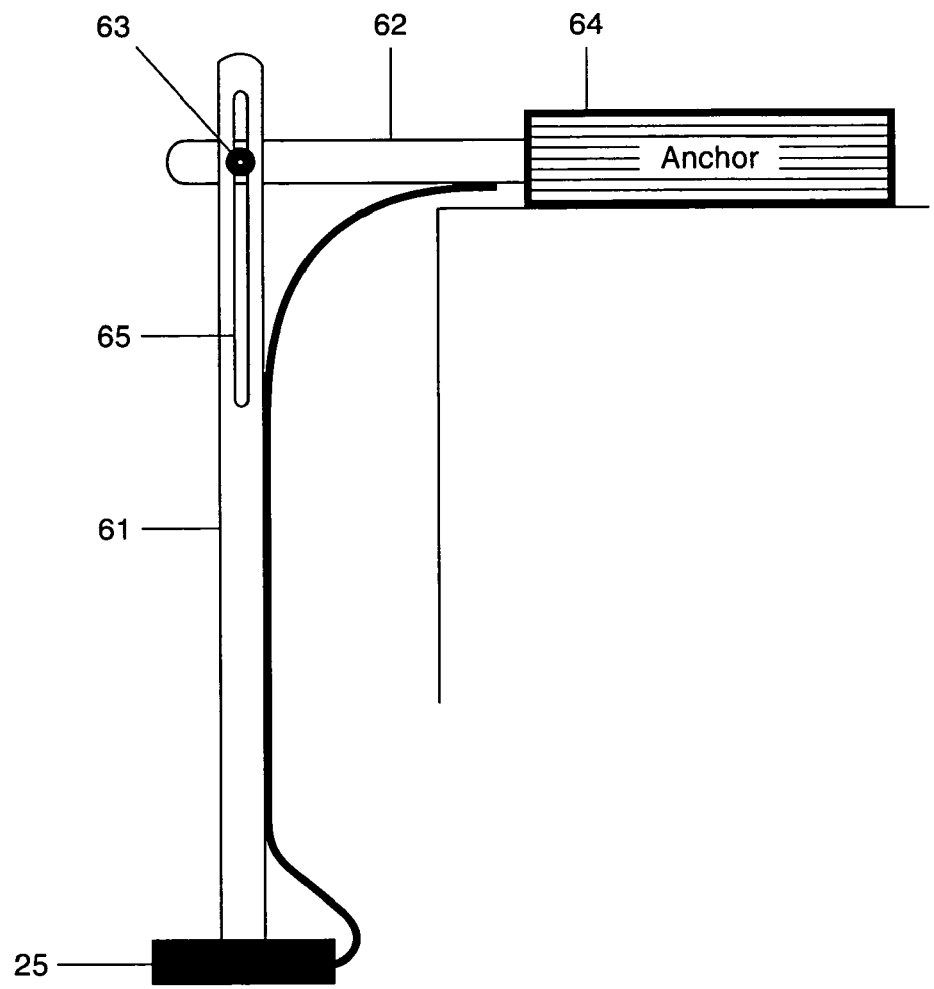
FIGS. 6A, 6B, 7A, 7B, 8A and 8B are side views of monitors and various camera supports for use herein.
Figure 6B:
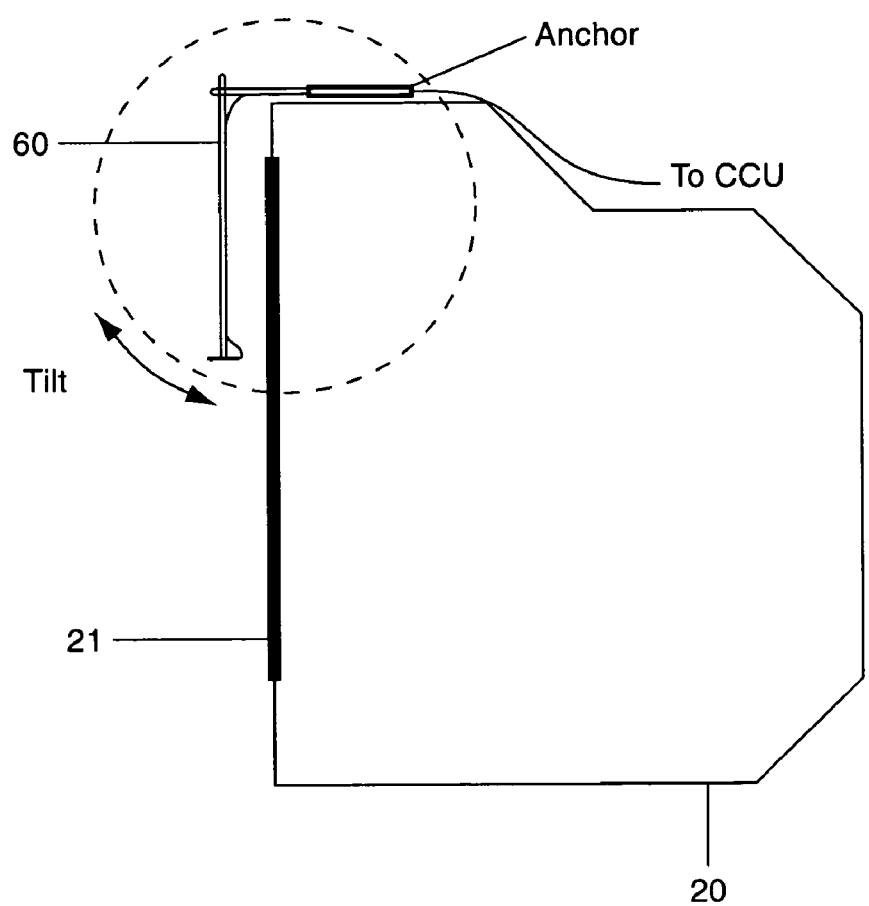

FIGS. 6A and 6B disclose the use of a manually operable support for adjustably positioning camera 25 in front of and proximate image field 21 of monitor 20. Vertical adjustment of camera 25 is accomplished by moving vertical support arm 61 vis à vis horizontal support arm 62 which is in turn removeably positioned atop monitor 20 through the use of anchor 64. Vertical support arm 61 is moved up or down by loosening lock screw 63 enabling vertical support arm 61 to move along slot 65. Camera tilt is obtained by pivoting vertical support arm 61 on the axis of lock screw 63. When the desired vertical field of view is obtained in positioning of camera 25 within the emotionally neutral field 35 of the image of a remotely located conferee, lock screw 63 can be tightened to prevent inadvertent movement. Manually rotating the anchor 64 about its vertical axis pans the camera 25 and will enable the user to adopt a desired horizontal field of view.

Figure 7A:
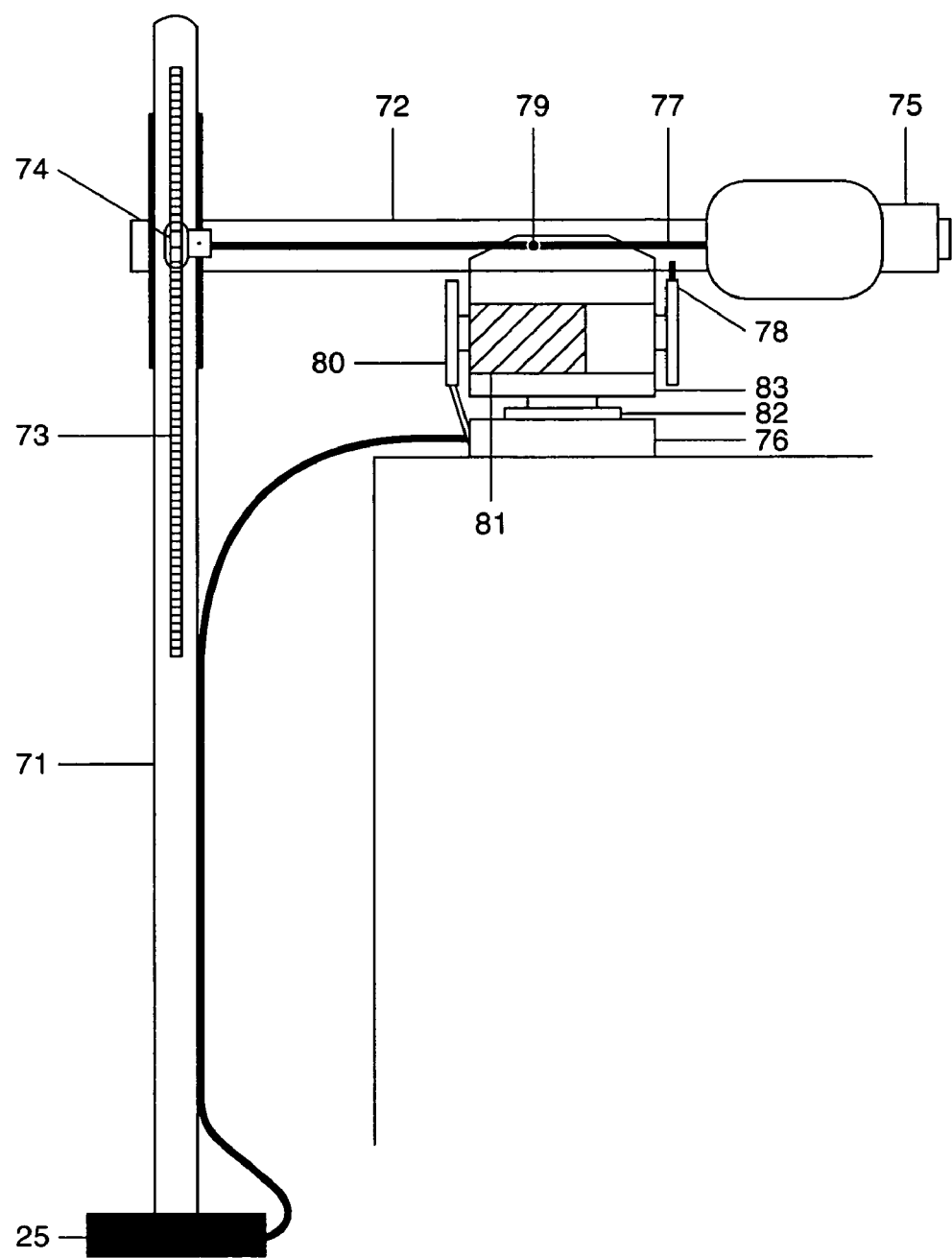
Figure 7B:
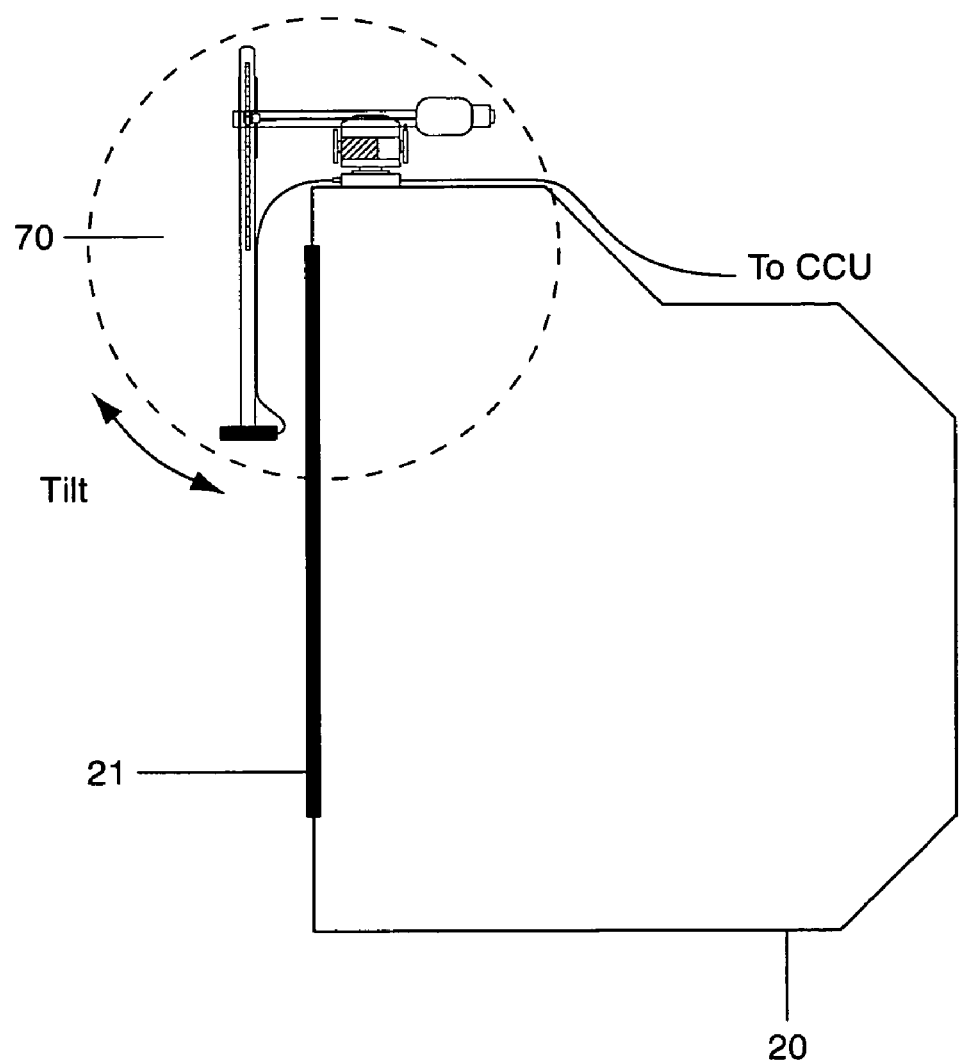

Camera 25 can also be manipulated remotely by employing a device such as that depicted in FIGS. 7A and 7B. Camera 25 can be vertically moved using a remote control to signal a remote controller (not shown) for small DC electric motor 75. Planetary gears reduce the rpm of the motor which is connected to shaft 77 which, in turn, is connected to pinion gear 74. Rack 73 is made a part of vertical support arm 71 which supports camera 25. Camera tilt is accomplished by using a suitable remote to control a signal directed to a tilt servo. The tilt servo drives tilt yoke 80 which is provided with a push-pull connection to horizontal support arm 72. Horizontal support arm 72 pivots on a pin at the center of rotation shown as element 79 of FIG. 7A. The vertical support arm 71 is rigidly connected to the horizontal support arm 72. Because of this rigid connection, tilting the horizontal support arm 72 with the tilt yoke 80 acts to tilt camera 25. Further, camera 25 can be panned by using the remote control to signal pan servo 81 which, in turn, drives pan yoke 78. Stage 80 is supported above base 76 on pan bearing 82 having a vertical axis of rotation. A push-pull connection between pan yoke 78 and stage 80 transfers pan yoke movements to stage movements. Since all active components are supported on base 76, rotating the stage with the pan yoke pans camera 25.

Figure 8A:
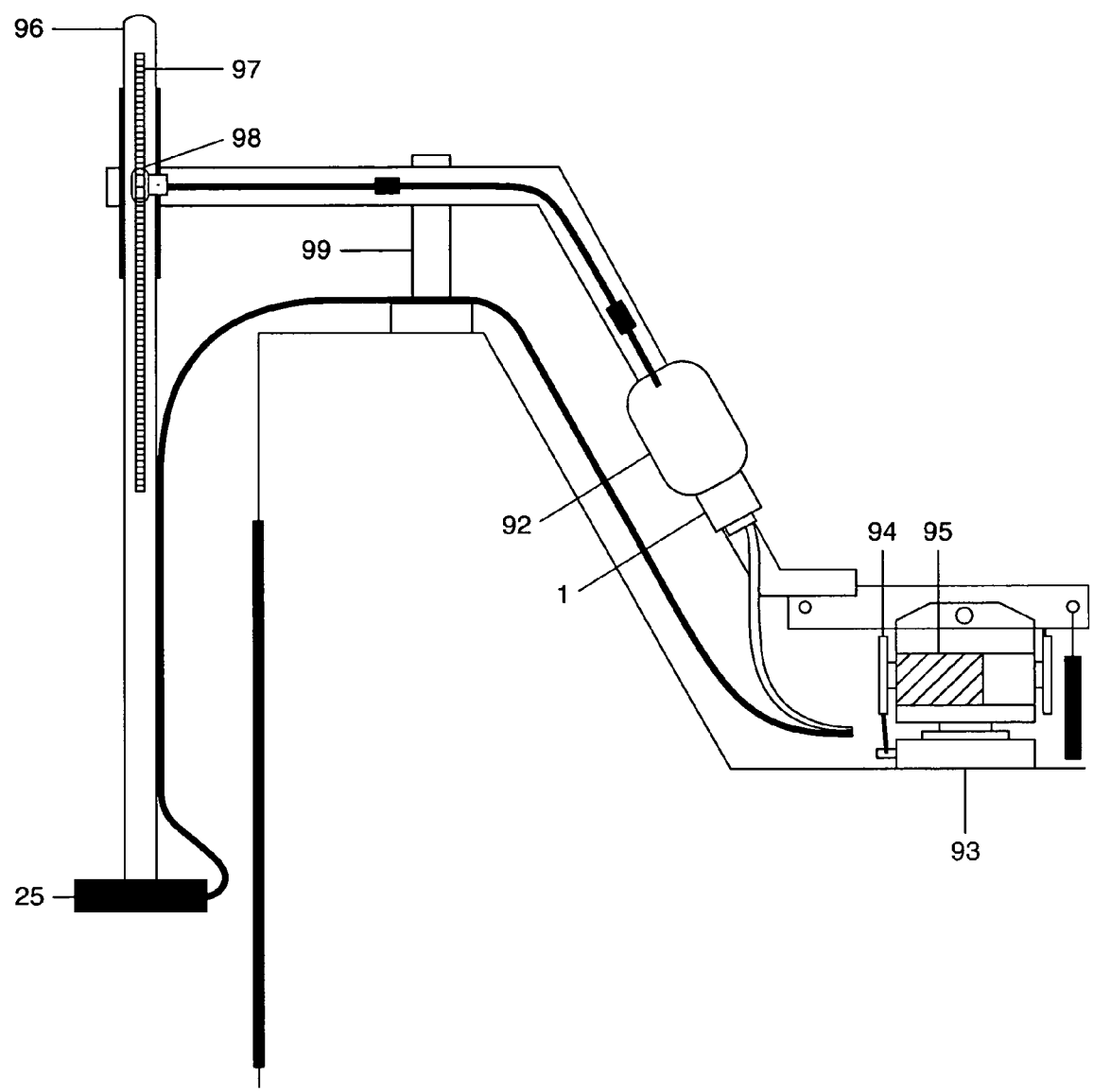
Figure 8B:
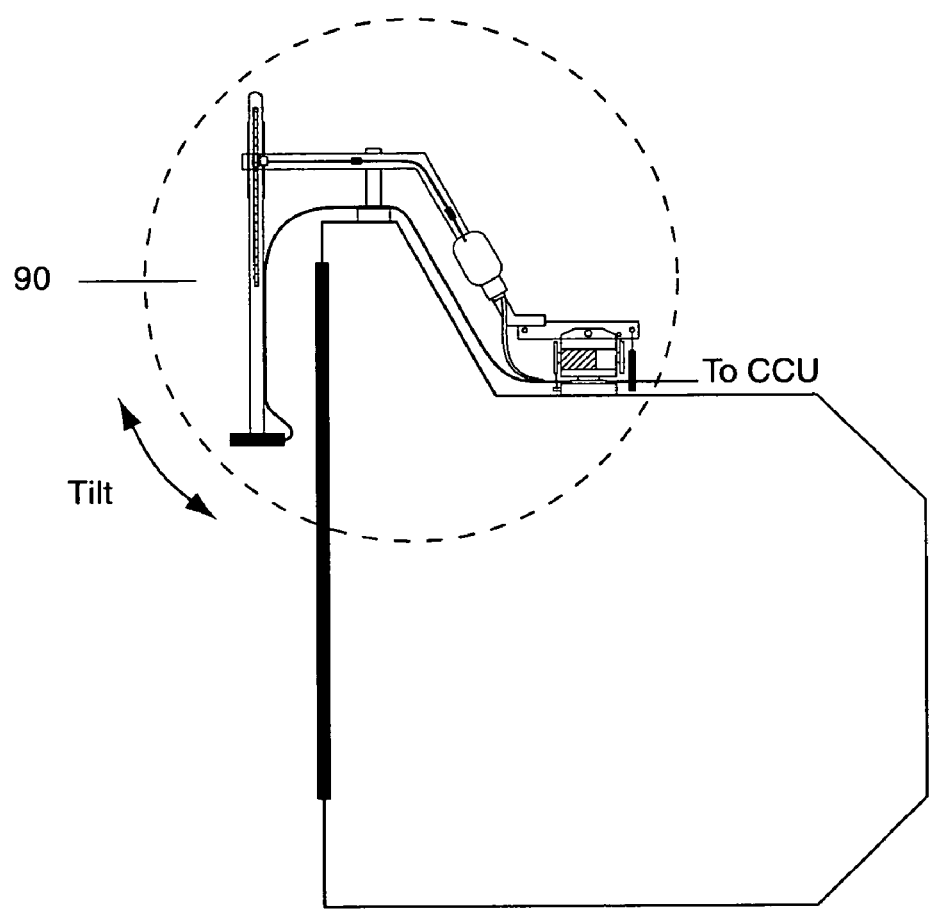

The embodiment shown in FIGS. 8A and 8B can also be employed to adjust positioning of camera 25 noting that most of the hardware used to do so remains out of sight of the conferee. As in the previous embodiment, support system 90 is capable of providing remote, pan, tilt, up and down operation of camera 25 similar to that described with respect to FIGS. 7A and 7B. However, with base 93, motor 91, planetary gears 92, pan yoke 94 and pan servo 95 all hidden from view, the conferee sees only a 3 square inch component "footprint" in the embodiment shown in FIGS. 8A and 8B compared to a 10 square inch "footprint" for the embodiment shown in FIGS. 7A and 7B. As noted in reference to FIG. 8A, only vertical support arm 96 containing rack 97 and pinion 98, support 99 and camera 25 remain visible.

The invention claimed is:

1. In a method of video conferencing between first and second conference locations, said first conference location having a first video conferee, a first video camera and first image monitor and said second conference location having a second video conferee, a second video camera and a second image monitor wherein said first video monitor displays an image of said second video conferee and said second video monitor displays an image of said first video conferee and, wherein said first and second video conferees face said first and second video cameras and first and second video monitors, respectively, the improvement comprising locating said first and second video cameras proximate said first and second image monitors, respectively, such that said first and second video cameras are aimed at said first and second video conferees, respectively, creating an angle between the optical axis of each of said video cameras and sight line established between the eyes of video conferees, said angle θ, defined by the equation:

$$\theta = (\tan^{-1}(H/D))$$

wherein= H=camera height above the eye-to-eye sight line
D=horizontal distance of each camera to its conferee
and wherein θ is ≦3 degrees.

2. The method of claim 1 wherein said video conferees are located between approximately 2 to 8 feet from each of conferee's video cameras.

3. The method of claim 2 wherein the video images of each first and second conferees as appearing upon said second and first video monitors at second and first conference locations, respectively, are approximately the size of said conferees.

4. The method of claim 1 wherein each of said first and second video cameras are characterized as having a length along its optical axis and a lens diameter perpendicular thereto.

5. The method of claim 4 wherein each of said first and second video cameras is characterized as having a lens diameter no greater than approximately 0.47 inches.

6. The method of claim 4 wherein each of said first and second video cameras is characterized as having a lens diameter no greater than approximately 0.28 inches.

7. The method of claim 1 wherein said first and second video and cameras are adjustably positionable upon said first and second video monitors such that said first video camera is adjustably maintained within said emotionally neutral field of the image of said second conferee appearing upon said first video monitor and is further adjustable to maintain its optical axis aimed at the eyes of said first video conferee and said second video camera is adjustably maintained within said emotionally neutral field of the image of said first conferee appearing upon said second video monitor and is further adjustable to maintain its optical axis aimed at the eyes of said second video conferee.

8. The method of claim 7 wherein said first and second video cameras are remotely adjustable at a distance from each camera location.

9. In a device for video conferencing between first and second conference locations, said first conference location having a first video conference, a first video camera and a first image monitor and said second conference location having a second video conferee, a second video camera and a second image monitor wherein said first video monitor displays an image of said second video conferee and said second video monitor displays an image of said first video conferee and wherein said first and second video conferees face said first and second video cameras and first and second video monitors, respectively, the improvement comprising positioning said first and second video cameras upon first and second monitors, respectively, such that said first video camera is place upon an emotionally neutral field of the image of said second video conferee and said second video camera is placed upon an emotionally neutral field of the image of said first video conferee and wherein said first and second video cameras are aimed at said first and second video conferees, respectively, creating an angle between the optical axis of each of said video cameras and sight line established between the eyes of video conferees, said angle θ, defined by the equation:

$$\theta = (\tan^{-1}(H/D))$$

wherein= H=camera height above the eye-to-eye sight line between conferees
D=horizontal distance of each camera to its conferee
and wherein θ≦3 degrees.

10. The device of claim 9 wherein said video conferees are located between approximately 2 to 8 feet from each of conferees video cameras.

11. The method of claim 10 wherein the video images of each first and second conferees as appearing upon the video monitors at said second and first conference locations, respectively, are approximately the size of said conferees.

12. The device of claim 9 wherein each of said first and second video cameras are characterized as having a length along its optical axis and a lens diameter perpendicular thereto.

13. The device of claim 12 wherein each of said first and second video cameras is characterized as having a lens diameter no greater than approximately 0.47 inches.

14. The device of claim 12 wherein each of said first and second video cameras is characterized as having a lens diameter no greater than approximately 0.28 inches.

* * * * *